United States Patent
Balck et al.

(10) Patent No.: US 10,111,241 B2
(45) Date of Patent: Oct. 23, 2018

(54) METHODS AND ARRANGEMENTS FOR OPTIMIZING RADIO RESOURCE UTILIZATION AT GROUP COMMUNICATIONS

(71) Applicant: Telefonaktiebolaget L M Ericsson (publ), Stockholm (SE)

(72) Inventors: Kenneth Balck, Linköping (SE); Micael Martell, Kungsbacka (SE); Joakim Åkesson, Landvetter (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 73 days.

(21) Appl. No.: 14/842,931

(22) Filed: Sep. 2, 2015

(65) Prior Publication Data

US 2015/0373734 A1     Dec. 24, 2015

Related U.S. Application Data

(63) Continuation of application No. 13/520,427, filed as application No. PCT/SE2010/050010 on Jan. 4, 2010, now Pat. No. 9,143,980.

(51) Int. Cl.
*H04W 72/10* (2009.01)
*H04W 72/04* (2009.01)
(Continued)

(52) U.S. Cl.
CPC ........... *H04W 72/10* (2013.01); *H04W 28/06* (2013.01); *H04W 72/005* (2013.01); *H04W 4/06* (2013.01);
(Continued)

(58) Field of Classification Search
CPC ... H04W 28/06; H04W 4/06; H04W 72/0453; H04W 76/02; H04W 48/08; H04W 72/10;
(Continued)

(56) References Cited

U.S. PATENT DOCUMENTS 9,143,980 B2 * 9/2015 Balck ............... H04W 28/06
2006/0203756 A1    9/2006 Hu
(Continued)

FOREIGN PATENT DOCUMENTS

EP     1 833 217 A1    9/2007
EP     2131562       12/2009
(Continued)

OTHER PUBLICATIONS

3GPP TSG-SA4 Meeting #39, Dallas, US, May 15-19, 2006; Tdoc S4-060239; Proposed May 2006 Change Request (6 pgs).
(Continued)

*Primary Examiner* — Bobbak Safaipour
(74) *Attorney, Agent, or Firm* — Baker Botts, LLP

(57) ABSTRACT

The present invention relates to methods and arrangements of optimizing radio resource utilization at a group communication for members of a specific group in a communication network system, comprising communication network nodes (15) communicating over a radio interface on downlink (12) and uplink (13) radio bearers with a plurality of user equipments (18) each of which is associated with one of said members. A shared downlink radio bearer for low priority listening members of said specific group is established. The low priority listening members are assigned to the shared downlink radio bearer.

16 Claims, 6 Drawing Sheets

(51) Int. Cl.
  *H04W 28/06* (2009.01)
  *H04W 72/00* (2009.01)
  *H04W 4/06* (2009.01)
  *H04W 76/45* (2018.01)
  *H04W 76/10* (2018.01)

(52) U.S. Cl.
  CPC ........ *H04W 72/0453* (2013.01); *H04W 76/10* (2018.02); *H04W 76/45* (2018.02)

(58) Field of Classification Search
  CPC . H04W 72/1242; H04W 80/04; H04W 88/12; H04W 92/12
  See application file for complete search history.

(56) References Cited

U.S. PATENT DOCUMENTS

| | | | |
|---|---|---|---|
| 2008/0020775 A1* | 1/2008 | Willars | H04L 47/10 455/445 |
| 2008/0186893 A1 | 8/2008 | Kolding | |
| 2008/0212528 A1* | 9/2008 | Kazmi | H04W 72/10 370/329 |
| 2009/0247204 A1 | 10/2009 | Sennett | |
| 2010/0172281 A1* | 7/2010 | Hus | H04L 1/1607 370/312 |
| 2010/0232387 A1* | 9/2010 | Marchand | H04W 72/1284 370/329 |
| 2010/0279628 A1* | 11/2010 | Love | H04L 5/003 455/70 |
| 2010/0330995 A1* | 12/2010 | Aoyama | H04W 28/10 455/436 |
| 2011/0044225 A1* | 2/2011 | Rinne | H04W 72/005 370/312 |
| 2011/0267959 A1* | 11/2011 | Yi | H04W 72/10 370/241 |
| 2012/0207124 A1* | 8/2012 | Liu | H04W 72/1231 370/329 |

FOREIGN PATENT DOCUMENTS

| | | |
|---|---|---|
| EP | 2 278 830 A1 | 1/2011 |
| WO | 2006US21566 | 2/2007 |
| WO | WO 2007/040978 A2 | 4/2007 |
| WO | WO 2009/131087 A1 | 10/2009 |

OTHER PUBLICATIONS

3GPP TSG-SA4 Meeting #39, Dallas, US, May 15-19, 2006; Tdoc S4-060240; Proposed May 2006 Change Request (12 pgs).

3GPP TS 22.146 V9.0.0 (Jun. 2008); 3rd Generation Partnership Project; Technical Specification Group Services and System Aspects; Multimedia Broadcast/Multicast Jun. 2008 Service; Stage I (release 9) (18 pgs).

3GPP TS 36.321 V8.4.0 (Dec. 2008); 3rd Generation Partnership Project; Technical Specification Group Radio Access (E-UTRA) Medium Access Control (MAC) protocol Dec. 2008 specification (release 8) (43 pgs).

International Search Report for PCT/SE2010/050010 dated Oct. 6, 2010.

Extended European Search Report for Application No. / Patent No. 10841372.5-1854 / 2522177 PCT/SE2010050010—Sep. 29, 2016.

* cited by examiner

METHODS AND ARRANGEMENTS FOR OPTIMIZING RADIO RESOURCE UTILIZATION AT GROUP COMMUNICATIONS

PRIORITY

This application is a continuation, under 35 U.S.C. § 120, of U.S. application Ser. No. 13/520,427 filed Jul. 3, 2012, which is a national stage filing under 35 U.S.C. § 371 of International Patent Application Serial No. PCT/SE2010/050010 filed Jan. 4, 2010, and entitled "METHODS AND ARRANGEMENTS FOR OPTIMIZING RADIO RESOURCE UTILIZATION AT GROUP COMMUNICATIONS" both of which are hereby incorporated by reference in their entirety.

TECHNICAL FIELD

The present invention relates to methods and arrangements in a telecommunication system, in particular to arrangements allowing for optimizing radio resource utilization at group communications as well as methods for such optimization.

BACKGROUND

Under the development of the long term evolution (LTE) by the third generation partnership project (3GPP), broadcasting of user data, such as IP-TV, is currently being planned. Multimedia broadcast/multicast services (MBMS) is the technique envisioned for the broadcasting services in LTE.

The actors within the field of national security and public safety (NSPS) are engaged in a constant strive to protect the society and its citizens against attacks and dangers of various forms. The national security refers to the protection of the society against any form of attack. Public safety refers to the protection of the society from all types of harm, danger, injury or damage and is provided by emergency services, such as the police, the fire brigade etc. Reliable communication and information supply are critical for the success of a mission. Public safety organizations are, therefore, particularly interested in group communications, i.e. group calls, and dedicated resources are being provided for these organizations.

For national security and public safety (NSPS), a product release for LTE may be based on unicast, i.e. every participant in a group call, in addition to its default bearer, will get a dedicated channel to carry voice. A guaranteed bit rate (GBR) bearer is assumed to be allocated as dedicated bearer for each member participating in the group call. The current assumption is that it shall be possible to support at least 100 simultaneous users per cell on a 5 MHz bearer. For future product releases, the MBMS multicast mode would be a natural choice for NSPS group calls. In the MBMS multicast mode, the user subscribes to the multicast service and land charging data for the end user may be generated.

For scenarios where the participants in a group call tend to cluster, e.g. at the scene of some major fire or other accident, the number of users in one cell may exceed the capacity of an NSPS system based on unicast. To handle those scenarios, a broadcast solution would be needed. As stated above, MBMS is being standardized and it will take considerable time before MBMS capable user equipments (UEs) reach the market. There is, therefore, a need for a solution which overcomes at least one of the above-mentioned drawbacks.

SUMMARY

Accordingly, one objective of the present invention is to provide improved methods and arrangements for optimizing radio resource utilization at a group communication for members of a specific group in a communication network system, comprising communication network nodes communicating over a radio interface on downlink and uplink radio bearers with a plurality of user equipments each of which is associated with one of said members.

According to a first aspect of the present invention this objective is achieved through a method in a communication network node as defined in the characterizing portion of claim 1, which specifies that the radio resource utilization is optimized by a method comprising the steps of: establishing a shared downlink radio bearer for low priority listening members of said group; and, assigning said low priority listening members to said shared downlink radio bearer.

According to a second aspect of the present invention this objective is achieved through a method in a user equipment as defined in the characterizing portion of claim 9, which specifies that the radio resource utilization is optimized by a method comprising the steps of: when said user equipment is associated to a member being a low priority listening member, receiving an assignment to a shared downlink radio bearer established for low priority listening members of said group when said group communication is being set up; and, when said user equipment is associated to a member being a high priority member, receiving an assignment to a dedicated radio bearer.

According to a third aspect of the present invention this objective is achieved through an arrangement in a communication network node as defined in the characterizing portion of claim 10, which specifies that the radio resource utilization is optimized by the arrangement comprising a processing unit arranged to: establish a shared downlink radio bearer for low priority listening members of said group; and to assign said low priority listening members to said shared downlink radio bearer.

According to a fourth aspect of the present invention this objective is achieved through an arrangement in a user equipment as defined in the characterizing portion of claim 18, which specifies that the radio resource utilization is optimized by the arrangement comprising a receiving unit arranged to: receive, when said user equipment is associated to a member being a low priority listening member, an assignment to a shared downlink radio bearer established for low priority listening members of said group when said group communication is being set up; and to receive, when said user equipment is associated to a member being a high priority member, an assignment to a dedicated radio bearer.

Further embodiments are listed in the dependent claims.

Thanks to the provision of methods and arrangements, which minimize the number of dedicated radio bearers needed for a group communication based on unicast, a considerable capacity gain is achieved.

Still other objects and features of embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
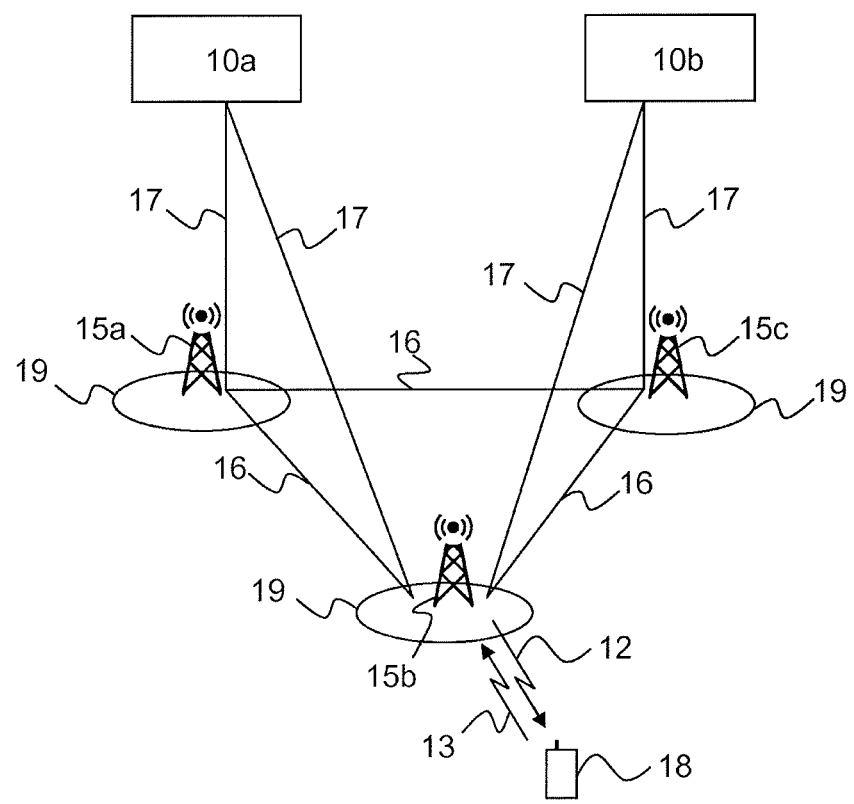
FIG. 1 shows a communication network architecture according to embodiments of the present invention.

FIG. 1 depicts a communication system, including a radio access system (RAN) such as E-UTRAN, comprising at least one Radio Base Station (RBS), such as evolved Node B (eNB) 15*a*, 15*b* and 15*c*. The RAN is connected over an interface such as the S1-interface 17 to at least one Evolved Packet Core (EPC) network 10*a* and 10*b*, which is connected to external networks (not shown in FIG. 1) such as the Public Switched Telephone Network (PSTN) or the Integrated Services Digital Network (ISDN), and/or a connectionless external network such as the Internet. Each EPC 10*a* and 10*b* comprises e.g. a Mobility Management Entity (MME) which handles control signalling for instance for mobility.

The RAN provides communication and control for a plurality of user equipments (UE) 18 (only one shown in FIG. 1) and each eNB 15*a*-15*c* is serving at least one cell 19 through and in which the UEs 18 are moving. The eNBs 15*a*-15*c* are communicating with each other over a communication interface 16, such as X2. The UEs each uses downlink (DL) channels 12 and uplink (UL) channels 13 to communicate with at least one eNB over a radio or air interface.

According to a preferred embodiment of the present invention, the communication system is herein described as a LTE system. The skilled person, however, realizes that the inventive methods and arrangements apply to other communications systems that employ unicast communication/transmission/bearers as well. Unicast transmission is the sending of messages to a single network destination host on a packet switching network. The user equipment 18 may be mobile stations such as mobile telephones, "cellular" telephones, and laptops with mobile connections and thus can be, for example, portable, pocket, hand-held, computer-included or car-mounted mobile devices which communicate voice and/or data with the RAN.

When a group call or group communication is set up the members of the group, i.e. user group, are invited into the call or communication by paging their respective user equipment. Each member/user equipment will access the network and enter radio resource control (RRC) connected mode. The member will be authenticated and be assigned a default bearer. Up to this point the set up is identical to a normal bearer setup. Depending on the priority of the member within the group, the member is, in addition to its default bearer, either assigned a dedicated bearer or is assigned as a listener to a dedicated bearer shared with a group of other listeners. This group of listeners could in an extreme case be all the non-talking members in the group call/communication or be a sub-group of those, listening to one out of several shared dedicated bearers, one for each sub-group of non-talking members. How such a shared downlink bearer is set up is described below.

Figure 2:
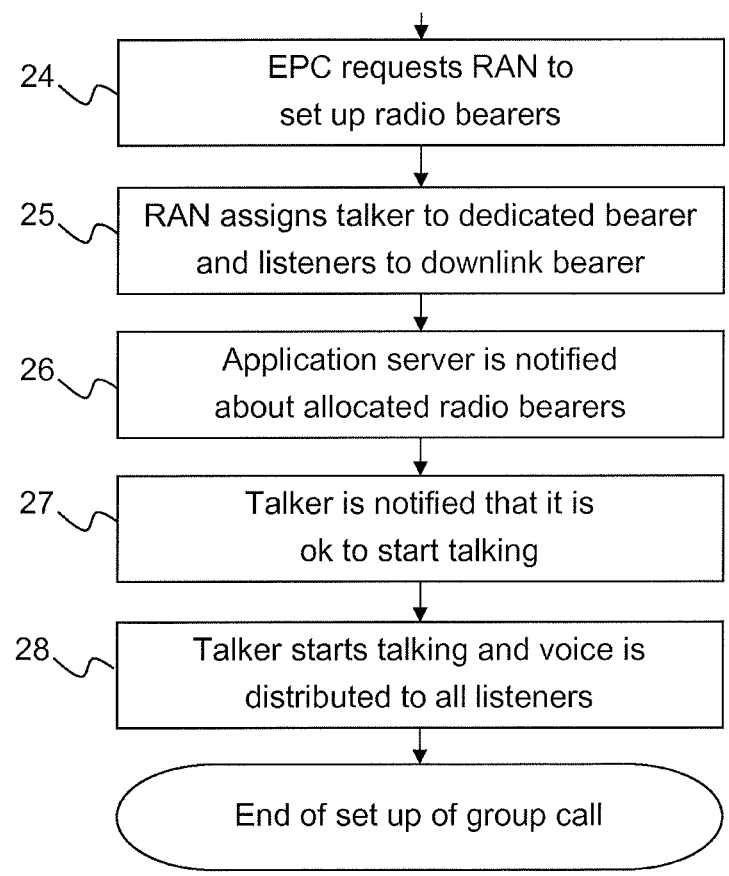
FIG. 2 is a flowchart showing the method steps used when setting up a group communication.

FIG. 2 is a flowchart illustrating the steps performed when setting up a group communication, in this specific example applied to the set-up of a group call, according to embodiments of the present invention. Thus, a member having the right to start a group call pushes a talk button on the user equipment in order to start the group call. A group call client in the starting UE, ie the UE of the member having the right to start a group call, requests the application server to set up a group call (step 21). The application server contacts the group call clients in affected UEs, ie the UEs of the other members of the user group, (step 22) and also requests the core network (EPC) to establish voice bearers for the group members (step 23). Then, the core network requests the RAN to set up dedicated radio bearers, in this example dedicated GBR E-UTRAN radio access bearers (E-RABs), for a talking member, which may initially be the member starting the group call and a first number of high priority members, and a shared downlink radio bearer, in this example a shared downlink GBR E-RAB, for a second number of low priority listening members (step 24). The RAN assigns the UEs of the talking member and the high priority members to the dedicated radio bearers and the listening UEs to the shared downlink radio bearer (step 25). The application server is notified about the allocated radio bearers, both the dedicated radio bearers and the shared downlink radio bearer (step 26) and the talking member is notified that it is ok to start talking (step 27). Finally, the talking member starts talking and the voice of the talking member is distributed to all listening members (step 28) and that is the end of setting up the group communication.

The members in a user group are assumed to have been assigned their priorities when the user group is defined. To ensure that the high priority members are assigned permanent dedicated radio bearers some different mechanisms may be envisioned. It should be noted that even though high and low priority members are discussed in this context, there are more than only two priority levels within the user group, i.e. there are different priorities among the members of e.g. the high priority member group. According to one embodiment the number of permanent dedicated radio bearers is pre-defined and the bearers are allocated in member priority order. According to another embodiment, a time window for the group call assignment is defined. The members assigned within the time window will get their own dedicated radio bearer. When the pre-defined number of bearers or the time window is exceeded, further assignments will be made on the shared downlink radio bearer as mentioned above.

Figure 3:
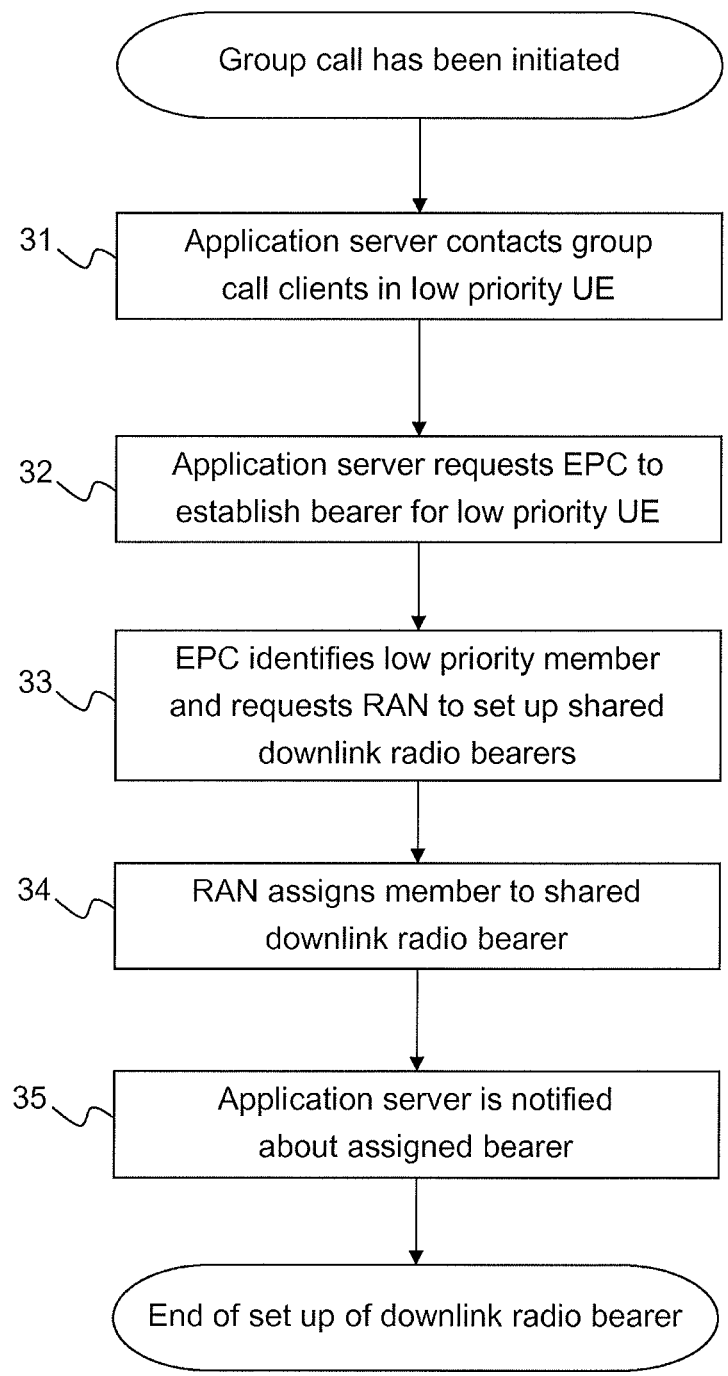
FIG. 3 is a flowchart showing the method steps used when establishing a shared downlink radio bearer.

FIG. 3 is a flowchart that illustrates the steps performed when a shared downlink radio bearer is established according to embodiments of the present invention. The shared downlink radio bearer is established when a group call or group communication has been initiated in the application server. First, the application server contacts the group communication client in an affected UE of a low priority member (step 31). The application server requests the core network to establish a bearer for the low priority member (step 32).

Then, the core network identifies the member as a low priority member and requests the RAN to set up a shared downlink radio bearer for the member (step 33). The RAN assigns the low priority member to the shared downlink radio bearer (step 34). Finally, the application server is notified about the assigned shared downlink radio bearer (step 35) and that is the end of setting up the shared downlink radio bearer.

The shared downlink radio bearer could be set up at the start of the group call or it could be set up when needed. For ease of implementation, according to embodiments of the present invention, the shared downlink radio bearer is associated with a UE context, in the MME and eNB, of a "virtual" UE addressed with a cell radio network temporary identifier (C-RNTI), just as any other UE. When a UE of a listening member shall be assigned to the shared downlink radio bearer, the C-RNTI of the "virtual" UE will be used as a second C-RNTI for the UE of the listening member. In addition the UEs of listening members each have a respective first C-RNTI that is used for addressing each individual UE in a conventional way.

The eNB will schedule group call or group communication data onto the C-RNTIs of the members with a dedicated radio bearer and onto the C-RNTI of the "virtual" UE. All members having been assigned the C-RNTI of the "virtual" UE as their second C-RNTI, will be able to listen to or in other way receive the group call or group communication data flow.

Since the radio bearer for the listening members, ie the shared downlink radio bearer, is uni-directional it will optionally need some special treatment. There will be no feedback for link adaptation and power control. To solve this, the "virtual" UE uses the link adaptation and power parameters from one of the user equipments associated with a member with a dedicated radio bearer. To ensure a high enough downlink power, the parameters of the UE furthest away from the eNB can be used. This UE is here referred to as the "host" for the "virtual" UE. Another aspect of the bearer being uni-directional is that no link layer re-transmission mechanism needs to be active.

When a member wishes to talk or in other way send information, the UE shall make a request on its default bearer. If the group communication takes place in form of a group call, the request will be to become the new talking member in the group call. If the talker-to-be, ie the new talking member, already has a dedicated radio bearer, being a high priority member, it will use that one for the communication. If the member on the other hand is a listener or receiver on the shared downlink radio bearer the UE will leave this radio bearer and be assigned a temporary dedicated radio bearer for the duration of the talk-session. The current talking member, if not a high priority member, will leave its temporary dedicated radio bearer and be assigned as a listener or listening member to the shared downlink radio bearer. This is illustrated in FIG. 4.

Figure 4:
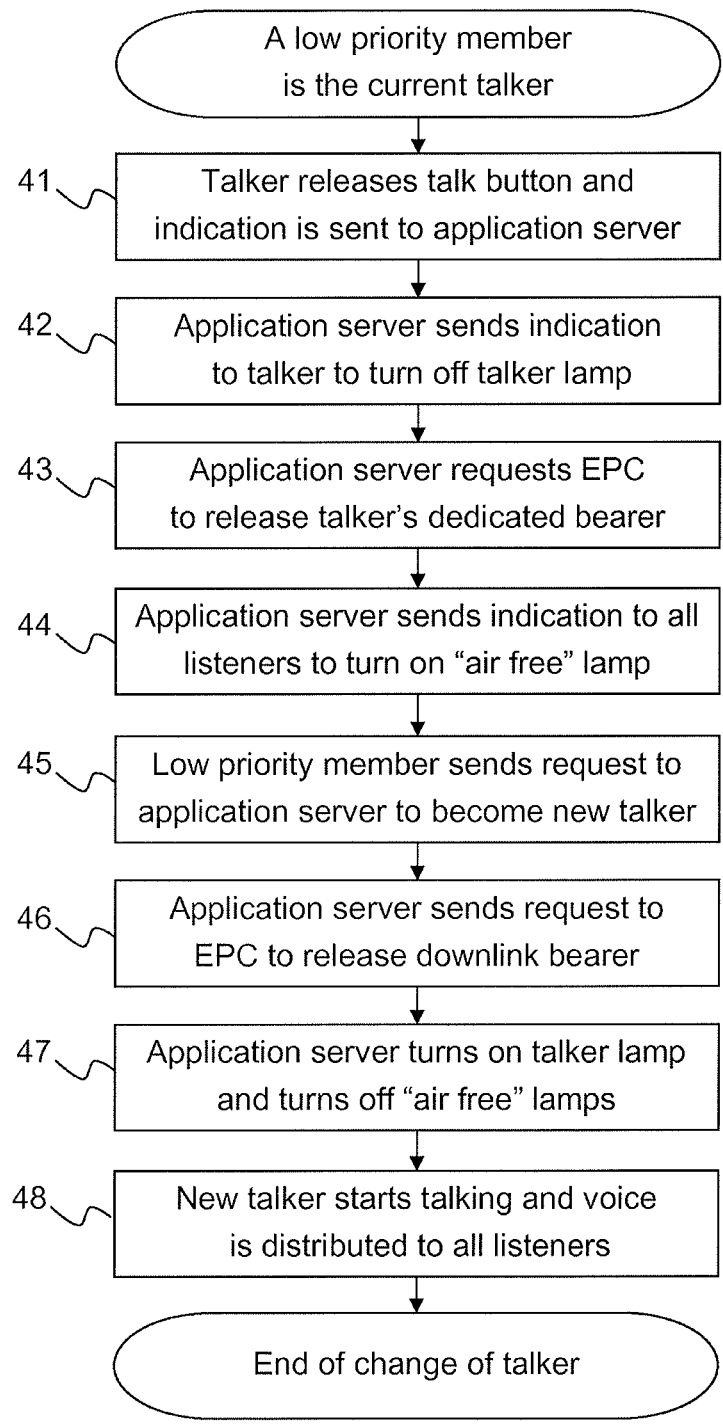
FIG. 4 is a flowchart showing the method steps used when changing talking member.

FIG. 4 is a flowchart showing the steps performed when changing the talking member in a group call according to embodiments of the present invention when a low priority member is the current talking member. The current talking member releases the talk button and an indication is sent to the application server (step 41). The application server sends an indication to the current talking member to turn off talker lamp, or other indicator (step 42) and, requests EPC to release the current talking member's temporary dedicated radio bearer and assign this member as a listener to the shared downlink radio bearer (step 43). Then, the application server sends an indication to all listening members to turn on "the air is free" lamp, or other indicator (step 44). A low priority member sends a request to the application server to become new talking member (step 45). Whereby the application server sends a request to EPC to set up a temporary dedicated radio bearer for the new talking member (step 46) and to re-assign the new talking member to this temporary dedicated radio bearer. Then, the application server turns on talker lamp for the new talking member and turns off the "the air is free" lamp for all listening members (step 47). Finally, the new talking member starts talking and the voice of the new talking member is distributed to all listening members (step 48) and that is the end of changing talking member.

At any given moment in a group call there will be the following categories of group members:
 1) High priority members with permanent dedicated radio bearers, these members are addressed by their respective individual C-RNTI:s
 2) The talking member having a temporary dedicated radio bearer if the talking member is a low priority member, or a permanent dedicated radio bearer if the talking member is a high priority member, it is addressed by its individual C-RNTI
 3) The listeners to the shared downlink radio bearer(s), having two addresses:
    a) the individual C-RNTI or first C-RNTI
    b) the C-RNTI associated with the shared downlink radio bearer, the "group C-RNTI" or second C-RNTI In the national security and public safety (NSPS) context, it may be of interest to be able to log which information has been received by the individual members of a group call. With each member having a dedicated radio bearer this task can be managed quite easily. With many members sharing a downlink radio bearer the task of logging received data must be placed within the individual UEs of listening members. Thus, each member acknowledges the data received during a group call in a separate session, on the application layer, after the group call or regularly during the group call. The uplink acknowledgement messages should be spread out randomly in time to avoid traffic peaks on the uplink from these messages.

The major simplification compared to Multimedia broadcast/multicast services (MBMS) is that neither the network nor the UE needs to implement the MBMS logical channel set.

Like for the MBMS multicast mode, the listening only user must subscribe to the service and must be authenticated before being assigned to a shared downlink radio bearer.

Since the network is in control of how many listeners are assigned to a shared downlink radio bearer, charging data may be generated per listening member.

Although embodiments of the invention have mainly been illustrated for the voice communication case, i.e. voice group call, the present invention is applicable also to other forms of group communication, for example data communication. In such embodiments a talking member would for example correspond to a data sending member and a listening member would correspond to a data receiving member. The group call client referred to throughout this description would be generalized to a group communication client.

Figure 5:
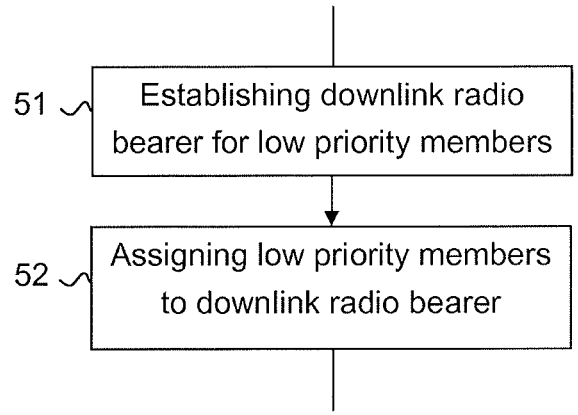
FIG. 5 is a flowchart illustrating the inventive method steps performed in a radio base station.

According to one embodiment of the present invention a procedure in a communication network node of optimizing radio resource utilization at a group communication for members of a specific group in a communication network system, comprising communication network nodes communicating over a radio interface on downlink and uplink radio bearers with a plurality of user equipments (18) each of which is associated with one of said members of the specific group, as shown in FIG. 5, is provided. The procedure comprises the steps of:
- establishing a shared downlink radio bearer for low priority listening or receiving members of said specific group (step 51);
- assigning said low priority listening or receiving members to said shared downlink radio bearer when said group communication is being set up (step 52).

According to some embodiments, the method further comprises the step of assigning dedicated radio bearers to high priority members.

According to some embodiments, the number of said dedicated radio bearers is pre-determined and, said dedicated radio bearers are allocated in priority order of the members of the specific group.

According to some embodiments, the method further comprises the step of defining a time window and assigning said dedicated radio bearers to high priority members within said time window.

According to some embodiments, said shared downlink radio bearer is established at the start of said group communication.

According to some embodiments, said shared downlink radio bearer is established when needed, e.g. when there are too few dedicated radio bearers.

According to some embodiments, the method further comprises the step of scheduling data for said group communication onto cell radio network temporary identifiers "C-RNTIs" of user equipments associated with members having a dedicated radio bearer and onto a cell radio network temporary identifier "C-RNTI" of a virtual user equipment.

According to some embodiments, link adaptation and power parameters from a user equipment associated with a member having a dedicated radio bearer are used for said virtual user equipment.

Figure 6:
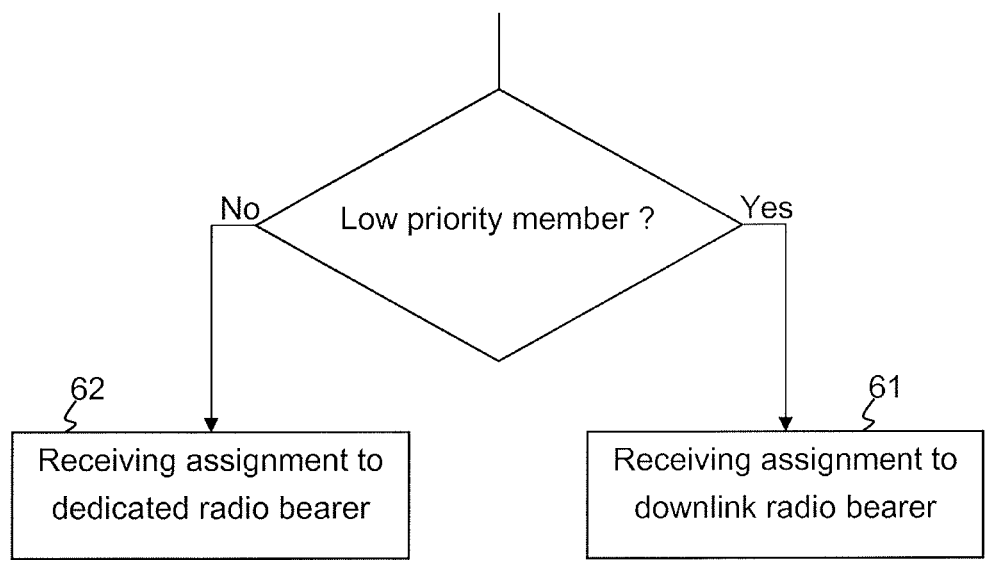
FIG. 6 is a flowchart illustrating the inventive method steps performed in a user equipment.

According to one embodiment of the present invention a procedure in a user equipment of optimizing radio resource utilization at a group communication for members of a specific group in a communication network system, comprising communication network nodes communicating over a radio interface on downlink and uplink radio bearers with a plurality of user equipments each of which is associated with one of said members of the specific group, as shown in FIG. 6, is provided. The procedure comprises the steps of:
- when said user equipment is associated to a member being a low priority listening or receiving member, receiving an assignment to a shared downlink radio bearer established for low priority listening or receiving members of said specific group when said group communication is being set up (step 61);
- when said user equipment is associated to a member being a high priority member, receiving an assignment to a dedicated radio bearer when said group communication is being set up (step 62).

Figure 7:
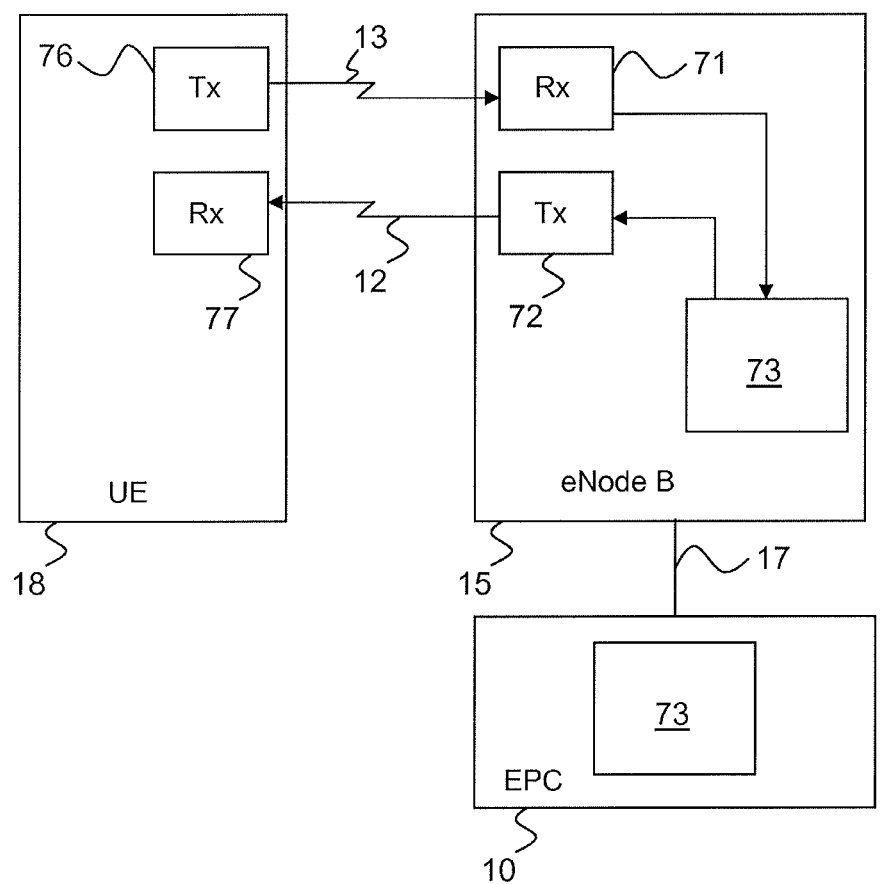
FIG. 7 is a simplified block diagram of an inventive user equipment and communication network node.

FIG. 7 is a block diagram showing a user equipment 18, a radio base station (RBS) 15, such as eNode B, and a EPC 10 of optimizing radio resource utilization at a group communication for members of a specific group in a communication network system, comprising communication network nodes (15) communicating over a radio interface on downlink (12) and uplink (13) radio bearers with a plurality of user equipments (18) each of which is associated with one of said members of the specific group.

The RBS 15 comprises a radio transmitter 72 and a receiver 71. The transmitter 72 is transmitting data packets to a receiver 77 of the user equipment 18 over a radio interface on the downlink channel 12. The receiver 71 is receiving data packets from the user equipment 18 over the radio interface on the uplink channel 13. The RBS 15 optionally further comprises a processing unit 73 arranged to:
- establish a shared downlink radio bearer for low priority listening or receiving members of said specific group;
- assign said low priority listening or receiving members to said shared downlink radio bearer when said group communication is being set up.

The user equipment 18 comprises a radio transmitter 76 arranged to transmit data packets to the receiver 71 of the RBS 15 over the radio interface on the uplink channel 13 and a receiver 77 arranged to receive data packets transmitted from the transmitter 72 of the RBS 15 on the downlink channel 12. The receiver 77 is further arranged to receive, when said user equipment is associated to a member being a low priority listening or receiving member, an assignment to a shared downlink radio bearer established for low priority listening or receiving members of said specific group when said group communication is being set up, and to receive, when said user equipment is associated to a member being a high priority member, an assignment to a dedicated radio bearer when said group communication is being set up.

The EPC is communicating with the RBS 15 via the interface 17 and optionally comprises a processing unit 73 configured to
- establish a shared downlink radio bearer for low priority listening or receiving members of said specific group;
- assign said low priority listening or receiving members to said shared downlink radio bearer when said group communication is being set up.

According to some embodiments of the invention, the processing unit (73) is further arranged to assign dedicated radio bearers to high priority members.

According to some embodiments of the invention, the number of said dedicated radio bearers is pre-determined and, said processing unit is arranged to allocate said dedicated radio bearers in priority order of the members of the specific group.

According to some embodiments of the invention, said processing unit 73 is further arranged to define a time window and to assign said dedicated radio bearers to high priority members within said time window.

According to some embodiments of the invention, said processing unit 73 is arranged to establish said shared downlink radio bearer at the start of said group communication.

According to some embodiments of the invention, said processing unit 73 is arranged to establish said shared downlink radio bearer when needed, e.g. when there are too few dedicated radio bearers.

According to some embodiments of the invention, said processing unit 73 is further arranged to schedule data for said group communication onto cell radio network temporary identifiers "C-RNTIs" of user equipments associated with members having a dedicated radio bearer and onto a cell radio network temporary identifier "C-RNTI" of a virtual user equipment.

According to some embodiments of the invention, link adaptation and power parameters from a user equipment associated with a member having a dedicated radio bearer are used for said virtual user equipment.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, that the invention is limited only as indicated by the scope of the claims appended hereto.

Expressions such as "including", "comprising", "incorporating", "consisting of", "have", "is" used to describe and claim embodiments of the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a communication network node for optimizing radio resource utilization in a group communication between members of a specific group in a communication network system, comprising communication network nodes communicating over a radio interface on downlink and uplink radio bearers with a plurality of user equipments each of which is associated with one of said members of the specific group, wherein the method comprises the steps of:
   establishing a shared downlink radio hearer, wherein the shared downlink radio bearer is a dedicated bearer shared with a group of listening members of said specific group;
   assigning low priority members of said specific group to said shared downlink radio hearer, in addition to their respective default hearers; and
   assigning dedicated radio bearers to high priority members of said specific group, in addition to their respective default bearers, wherein high priority members have a higher priority than lower priority members to radio resources in the group communication;
   wherein:
      a user equipment sends a request to become a new talking member in the group communication on its respective default bearer when the respective associated member wishes to communicate in the group communication;
      if the new talking member is a high priority member assigned a dedicated radio bearer, the new talking member communicates in the group communication using the assigned dedicated radio bearer; and
      if the new talking member is a low priority member, the new talking member communicates in the group communication using an assigned temporary dedicated radio bearer.

2. A method according to claim 1, wherein the number of said dedicated radio bearers is pre-determined and, said dedicated radio bearers are allocated in priority order of said members of the specific group.

3. A method according to claim 1, further comprising the step of defining a time window and assigning said dedicated radio bearers to high priority members within said time window.

4. A method according to claim 1, wherein said shared downlink radio bearer is established at the start of said group communication.

5. A method according to claim 1, wherein said shared downlink radio bearer is established when needed.

6. A method according to claim 1, further comprising the step of scheduling data for said group communication onto cell radio network temporary identifiers "C-RNTIs" of user equipments associated with members having a dedicated radio bearer and onto a cell radio network temporary identifier "CRNTI" of a virtual user equipment.

7. A method according to claim 6, wherein link adaptation and power parameters from one user equipment associated with a member having a dedicated radio bearer are used for said virtual user equipment.

8. A method in a user equipment for optimizing radio resource utilization in a group communication between members of a specific group in a communication network system, comprising communication network nodes communicating over a radio interface on downlink and uplink radio hearers with a plurality of user equipments each of which is associated with one of said members of the specific group, wherein the method comprises the steps of:
   when said user equipment is associated to a member being a low priority member, receiving an assignment to a shared downlink radio bearer, in addition to a default bearer, wherein the shared downlink radio bearer is a dedicated bearer shared with a group of listening members;
   when said user equipment is associated to a member being a high priority member of said specific group, receiving an assignment to a dedicated radio bearer, in addition to its default bearer, wherein high priority members have a higher priority than low priority members to radio resources in the group communication;
   requesting on the default bearer to he become a new talking member in the group communication;
   wherein:
      if the user equipment is associated with a high priority member, communicating in the group communication using the assigned dedicated radio bearer; and
      if the user equipment is associated with a low priority member, communicating in the group communication using the temporary dedicated radio bearer.

9. An arrangement in a communication network node for optimizing radio resource utilization in a group communication between members of a specific group in a communication network system, comprising communication network nodes communicating over a radio interface on downlink and uplink radio bearers with a plurality of user equipments each of which is associated with one of said members of the specific group, wherein the arrangement comprises a processing unit arranged to:
   establish a shared downlink radio bearer, wherein the shared downlink radio bearer is a dedicated bearer shared with a group of listening members of said specific group;
   assign low priority members of said specific group to said shared downlink radio bearer, in addition to their respective default bearers; and
   assign dedicated radio bearers to high priority members of said specific group, in addition to their respective default bearers, wherein high priority members have a higher priority than lower priority members to radio resources in the group communication;
wherein:
a user equipment sends a request to become a new talking member in the group communication on its respective default bearer when the respective associated member wishes to communicate in the group communication;
if the new talking member is a high priority member assigned a dedicated radio bearer, the new talking member communicates in the group communication using the assigned dedicated radio bearer; and
if the new talking member is a low priority member, the new talking member communicates in the group communication using an assigned temporary dedicated radio bearer.

10. An arrangement according to claim 9, wherein the number of said dedicated radio hearers is pre-determined and, said processing unit is arranged to allocate said dedicated radio bearers in priority order of said members of the specific group.

11. An arrangement according to claim 9, wherein said processing unit further is arranged to define a time window and to assign said dedicated radio hearers to high priority members within said time window.

12. An arrangement according to claim 9, wherein said processing unit is arranged to establish said shared downlink radio bearer at the start of said group communication.

13. An arrangement according to claim 9, wherein said processing unit is arranged to establish said shared downlink radio bearer when needed.

14. An arrangement according to claim 9, wherein said processing unit further is arranged to schedule data for said group communication onto cell radio network temporary identifiers "C-RNTIs" of user equipments associated with members having a dedicated radio bearer and onto a cell radio network temporary identifier "C-RNTI" of a virtual user equipment.

15. An arrangement according to claim 14, wherein link adaptation and power parameters from one user equipment associated with a member having a dedicated radio hearer are used for said virtual user equipment.

16. An arrangement in a user equipment for optimizing radio resource utilization in a group communication between members of a specific group in a communication network system, comprising communication network nodes communicating over a radio interface on downlink and uplink radio bearers with a plurality of user equipments each of which is associated with one of said members of the specific group, wherein the arrangement comprises a receiving unit arranged to:
receive, when said user equipment is associated to a member being a low priority listening member, an assignment to a shared downlink radio bearer, in addition to a default bearer, wherein the shared downlink radio bearer is a dedicated bearer shared with a group of listening members;
receive, when said user equipment is associated to a member being a high priority member of said specific group, an assignment to a dedicated radio bearer, in addition to its default bearer, wherein high priority members have a higher priority than low priority members to radio resources in the group communication;
request on the default bearer to become a new talking member in the group communication;
wherein:
if the user equipment is associated with a high priority member, communicating in the group communication using the assigned dedicated radio bearer; and
if the user equipment is associated with a low priority member, communicating in the group communication using the temporary dedicated radio bearer.

* * * * *